Dec. 25, 1962   J. W. GRAHAM   3,070,181
ROLLER BIT TOOTH
Filed May 9, 1960

INVENTOR.
JOHN W. GRAHAM,
BY Frank S. Troidl
ATTORNEY.

3,070,181
ROLLER BIT TOOTH
John W. Graham, Bellaire, Tex., assignor, by mesne assignments, to Jersey Production Research Company, Tulsa, Okla., a corporation of Delaware
Filed May 9, 1960, Ser. No. 27,915
2 Claims. (Cl. 175—331)

This invention relates to roller bits for deep well drilling. More particularly, this invention is a novel roller bit tooth.

For constant bit weight and rotary speed, the instantaneous penetration rate is inversely proportional to some power of the total crest area of the bit teeth:

$$\gamma \sim \frac{1}{(A)^k}$$

where $\gamma$=instantaneous penetration rate
$A$=total crest area
$k$=a constant Simply stated, the drilling rate is highest when the teeth are sharp, lowest when the teeth are dull.

As a drill is used for boring a hole into the earth the bit teeth become worn. As the teeth become excessively worn, the crest area of each tooth becomes larger, thus decreasing the penetration rate according to the formula mentioned above. If the penetration rate is decreased too much, the roller bit must be removed to the earth's surface and a new bit substituted for the worn bit. This, of course, is time consuming and expensive. A roller bit which includes teeth which are self-sharpening or is of a structure to generate additional teeth when the original teeth become excessively worn is obviously highly desirable. Such a roller bit would permit the drilling crew to continue drilling for a longer period of time than previously permitted. The penetration rate when using this self-sharpening or self-generating roller bit will decrease somewhat as the teeth become worn but will again increase to about that of a new bit as the new teeth are formed.

My invention provides the art with a roller bit tooth structure which has the above-mentioned desirable features of being self-sharpening and which multiplies the number of teeth on the roller bit as the original teeth become excessively worn. Briefly described, my new roller bit tooth includes a solid body member which has a hole formed therein. The solid body member continually increases in cross-sectional area as it is worn. Thus, as the cutting edges becomes excessively worn, the tooth will be worn up to the hole and a plurality of teeth are thereby formed from the original tooth which have a smaller total cross-sectional crest area than the cross-sectional crest area of the tooth just prior to the time the tooth was worn up to the hole.

The invention as well as its many advantages will be further understood by reference to the following detailed description and drawing in which.

Figure 3:
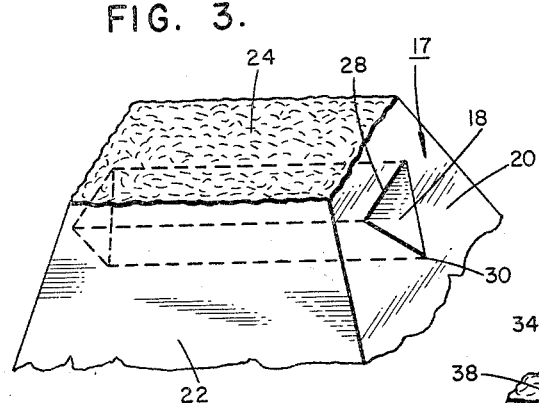
FIG. 3 is an enlarged view of a new roller bit tooth showing the tooth worn almost up to the hole formed therethrough.

Referring now to the drawings, the numeral 10 indicates a drill bit having a main body or shank 11 provided with the usual screw threads 12 on its upper portion for attaching the drill bit to a string of drill pipe by means of which the drill bit is rotatable in any suitable manner. The body is provided wtih a central bore through which drilling fluid may be passed downwardly from the drill pipe string to the earth formation being drilled and then upwardly through the drill pipe string-borehole annulus to the earth's surface.

The body 11 is enlarged at its lower end to provide a plurality of uniformly circumferentially spaced supporting arms 15 only one of which is shown in the drawing. A roller cutter 16 is mounted on a hub supported by the supporting arm 15. The roller cutter 16 has a plurality of teeth 17.

Each of the teeth 17 is provided with a hole or cavity 18. The cavity 18 may extend entirely through each tooth 17.

Figure 2:
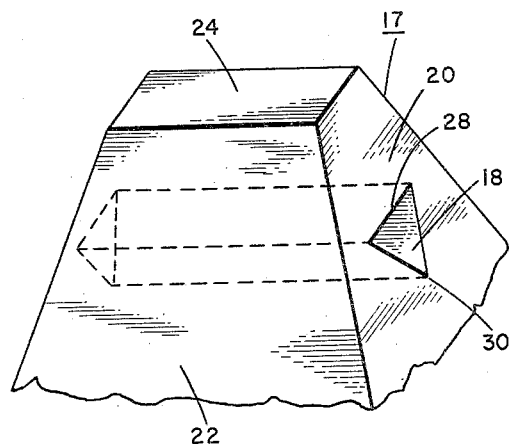
FIG. 2 is an enlarged view of a preferred form of one of my new roller bit teeth.

FIG. 2 is an enlarged view of one of the teeth 17. The roller bit tooth 17 consists of a substantially solid body. The solid body has four sides including the sides 20 and 22 (the other two sides cannot be seen in the figure), each of which taper inwardly to a substantially flat crest 24. With some teeth, the four sides taper to a sharp point rather than the flat crest shown in FIG. 2.

An opening such as the triangular opening 18 is formed through the tooth 17. Notice that the triangular opening 18 has its axis substantially 45° to the axis of the borehole when the tooth is resting on the bottom of the borehole. Notice that the base 28 of the triangular opening 18 is substantially parallel to the crest 24 or cutting edge of the tooth 17. A plane bisecting the angle formed by the apex 30 of the triangular opening 18 also bisects the base of the solid body. The triangular opening 18 may be an isosceles triangle.

FIG. 3 shows the tooth 17 after it has begun to become excessively worn. Notice that in FIG. 3 the crest 24 is of substantially greater cross-sectional area than it was initially as shown in FIG. 2. Thus, the drilling or penetration rate will be decreased substantially. With conventional roller bit teeth, the roller bit would have to be removed to the earth's surface and a new roller bit substituted therefor. However, with my new roller bit tooth, the bit member need not be removed to the earth's surface. This is so because as the tooth crest 24 of FIG. 3 becomes worn up to the base 28 of the triangular-shaped opening 18, two teeth are formed in place of the original one tooth. These teeth are shown in FIG. 4.

Figure 4:
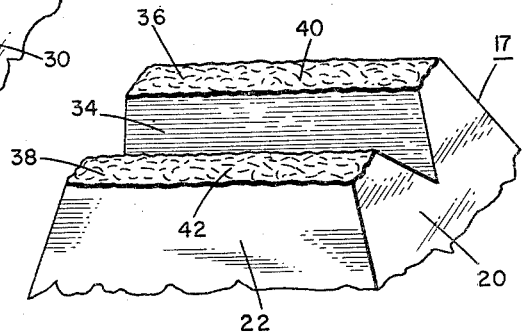
FIG. 4 is an enlarged view showing the generation of two teeth where originally there was only one tooth with the two teeth having a smaller total cross-sectional area than the one tooth.
Figure 1:
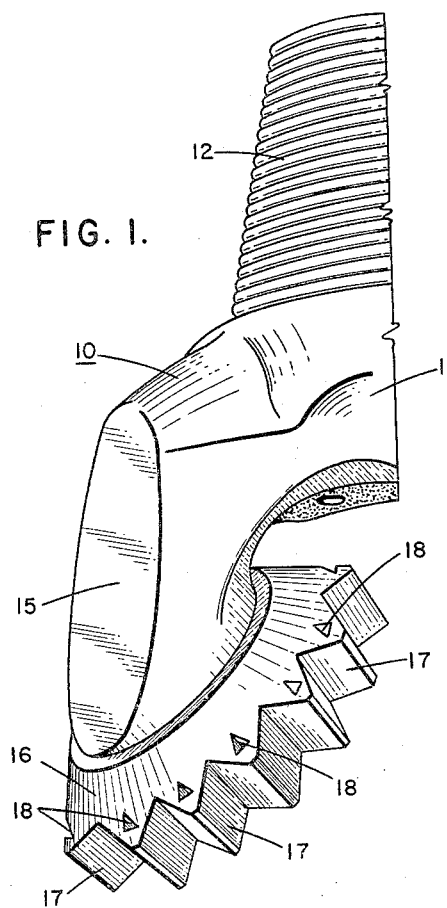
FIG. 1 is a fragmentary view of a drill bit incorporating my new roller bit teeth.

As shown in FIG. 4, when the tooth of FIG. 3 is worn up to the base 28 of the triangular opening 18, the triangular opening 18 becomes a downwardly and inwardly tapering groove 34. This groove effects the formation of a first tooth 36 and a second tooth 38. Tooth 36 is provided with a crest 40 of small cross-sectional area. Tooth 38 is also provided with a crest 42 of small cross-sectional area. A comparison of FIG. 3 and FIG. 4 makes it obvious that the combined cross-sectional area of crests 40 and 42 is less than the cross-sectional area of the crest 24 which has become worn. Therefore, the drilling rate or penetration rate of the roller bit is increased to a desirable rate and the roller bit need not be removed to the earth's surface. I have therefore provided the art with a self-sharpening and self-generating roller bit tooth.

The embodiment shown and described herein is a preferred embodiment. However, various other tooth shapes and hole shapes can be used without departing from the scope of the invention. It is contemplated that circular, elliptical, square, or rectangular holes serve the purpose. Also, the hole can be formed perpendicular to side 22 of the tooth, the only requirement being the renewal of small crest areas to give new bit performance when the hole is exposed.

I claim:
1. A roller bit tooth comprising: a solid body having a base and also having four sides tapering inwardly to a substantially flat crest forming a cutting edge, said solid body having a triangular opening formed therethrough, said triangular opening having a base substantially parallel to the crest of the solid body and an apex closer to the base of said solid body than the base of the triangular opening and located so that a plane bisecting the apex angle also bisects the base of the solid body, so that when the tooth is worn up to said opening a decrease in total crest area is effected.

2. A roller bit tooth comprising: a solid body member having a cutting edge and a single hole formed therethrough, the hole being spaced from the cutting edge, the shape of the solid body and the shape and position of the hole being such that as the roller bit tooth is worn up to the hole, the cutting edge area is increased with the cutting edge area decreasing after the roller bit tooth is worn to the hole.

References Cited in the file of this patent

UNITED STATES PATENTS

| | | |
|---|---|---|
| 994,866 | Muhleisen | June 13, 1911 |
| 1,163,867 | Shaffer | Dec. 14, 1915 |
| 1,572,386 | Gates | Feb. 9, 1926 |
| 2,312,176 | Kotowski | Feb. 23, 1943 |
| 2,833,521 | Olsen | May 6, 1958 |